Inventors
Karl Ackermann
Rudolf Socha
By Spencer & Kaye
ATTORNEYS

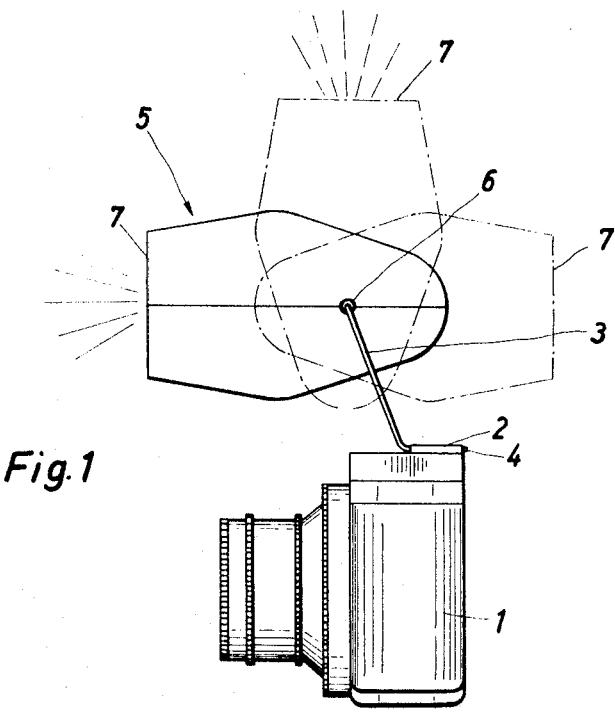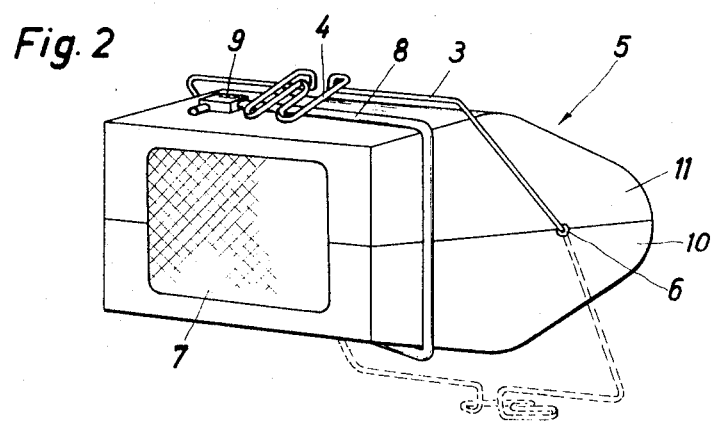

United States Patent Office 3,299,788
Patented Jan. 24, 1967

3,299,788
LIGHTING DEVICE
Karl Ackermann, Berlin-Charlottenburg, and Rudolf Socha, Berlin-Lichterfelde, Germany, assignors to Robert Bosch Elektronik G.m.b.H., Berlin-Wilmersdorf, Germany
Filed Aug. 31, 1964, Ser. No. 393,089
Claims priority, application Germany, Nov. 28, 1963, B 74,438
14 Claims. (Cl. 95—11)

The present invention relates to a unitary electronic flash device having a foot which is mounted on the housing so that the device is movable between at least two positions. The foot is designed for insertion into a mounting shoe on a photographic camera so that movement of the flash unit with respect to the camera actuates an operating switch provided in the device. In this manner, the switch is actuated when the foot is in at least one position with respect to the device, and, in at least one other position, the switch is turned off. The mounting shoe may, for instance, be mounted on the view finder of the camera.

Customarily, a foot mounted on the housing so as to be movable to two positions can be brought from a transport position, in which the foot can be countersunk into the housing or folded against it, to save space, into an operating position, in which it projects from the housing and can be inserted into the mounting shoe of the camera.

A foot-controlled switch was disclosed in German Gebrauchsmuster No. 1,845,263, which turns off the operating switch that actuates and de-actuates the device shortly before the foot is completely countersunk in the housing. Thus the flash device must be removed from the camera before it can be switched off, since only then can the bracket be folded to a position in which the switch de-actuates the device. However, this is very troublesome if, for example, the photographer wants to take several pictures at intervals and wants to switch off the electronic flash device between them, in order to save the batteries which are mounted in the device. He would have to remove the device from the camera during each interval, switch it off, switch it on again after the interval and then attach it again to the camera.

It is therefore a main object of the invention to eliminate the above-mentioned shortcomings.

It is another object of the present invention to provide a flash device which is turned on and off when its position relative to the camera is changed and while mounted to the camera.

These objects and others ancillary thereto are accomplished in accordance with preferred embodiments of the invention wherein a unitary electronic flash device is provided which includes a bracket extending around the device and pivotally mounted at its two ends in opposite side walls of the housing of the device.

Additional objects and advantages of the present invention will become apparent upon consideration of the following description when taken in conjunction with the accompanying drawings in which:

FIGURE 1 is a lateral view of a photographic camera with an attached electronic flash device, the reflector pointing in the picture-taking direction.

FIGURE 2 is a perspective view of the flash device of the present invention with the bracket folded into the transport position.

Figure 3:
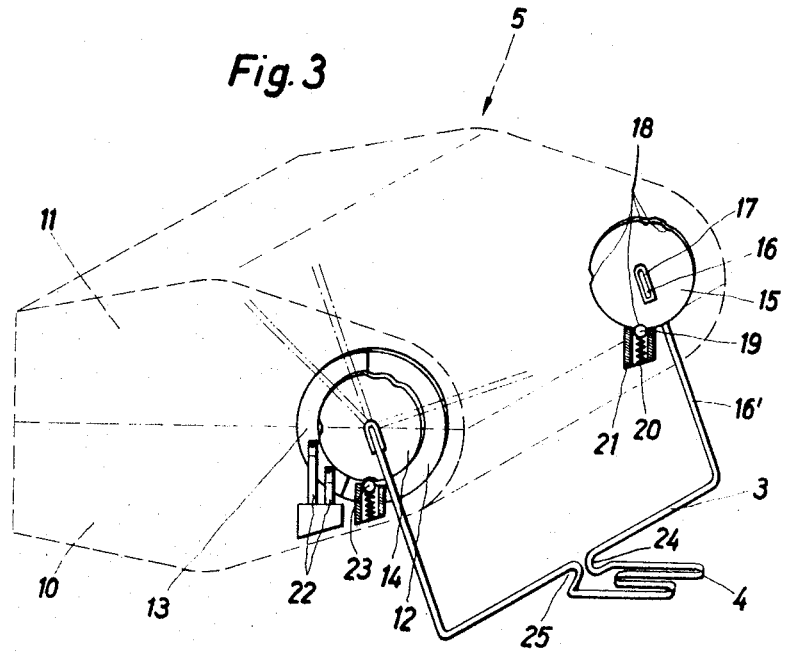
FIGURE 3 is a perspective view of the bracket together with a contact carrier and two discs producing the stops.

Because of the fact that the bracket extends around the device, it can be pivoted through an angle into the space-saving transport position carrying the movable contact carrier of an internal operating switch along with it. Conversely, it is also possible, when the bracket is held stationary (for example, when the foot forming the center part of the bracket is fixedly seated in the mounting shoe of a camera), to pivot the device with respect to the bracket, thus switching the device off without removing it from the camera. This is not possible with the known device.

Moreover, while the electronic flash device is attached to the camera, it cannot only be pivoted so that the reflector points in the picture-taking direction but it may be pivoted in other directions as well. The operating switch may be constructed such that its contacts remain closed for all directions of the reflector in which the device is to be used for taking pictures, and open only in a reflector direction which cannot be used for picture taking.

As will be seen from the drawings of the embodiment, the contacts of the operating switch, which may be a rotary switch, remain closed if the reflector points in the picture-taking direction (of the camera), or vertically upwardly or in any intermediate direction. These are all operating positions. It is useful to have the reflector direct the light vertically upwardly, for bounce-lighting off the ceiling of a room, for instance, if the object to be photographed is to be lighted only indirectly. As it would be of no use to be able to direct the reflector toward the rear, i.e., away from the object to be photographed, the contacts of the rotary switch can be permitted to open in this position called the "rest position."

The bracket can be folded entirely against the housing of the electronic flash device after the foot has been pulled out of the mounting shoe of the camera, so that, in this "transport position," the bracket is as little in the way as possible.

In order to maintain the bracket in each of the preselected pivotal positions securely, and also to hold the electronic flash device itself in its set position when the foot is inserted into the mounting shoe, it is possible, in a further development of the invention, to provide bracket stops. These may be fashioned, for example, as ball stops, for certain pivotal positions corresponding to preselected operating, rest, and/or transport positions of the device.

Referring more specifically to FIGURE 1, an electronic flash device 5, its reflector opening 7 pointing to the left in this illustration, is attached to a photographic camera 1, by a foot 4 inserted into a mounting shoe 2 of known construction which is provided on the top of the camera. The foot 4 is, as shown in FIGURE 3, part of a bracket 3 extending around the device. This bracket is pivotally mounted in two openings 6 provided in opposite sides of the housing of the flash device, and only one of these openings is shown in FIGURE 1.

Thus, when foot 4 on the bracket 3 is inserted into the mounting shoe 2, the electronic flash device 5 can be pivoted over a very large angle into various positions, three of which are shown in FIGURE 1. The bold lines show the reflector 7 of the flash device pointing in the picture-taking direction of the camera 1. The positions of the flash device pointing upwardly and opposite the picture-taking direction, respectively, are indicated by dashed lines. As will be explained below, the electronic flash device is switched into its operating position when the reflector points to the left or upwardly. However, when the reflector points to the right, it is switched off, in what may be referred to as a rest position.

A fourth position of the bracket 3 with respect to the flash device 5, when the latter is removed from the camera 1, is shown in bold lines in FIGURE 2. Here, bracket 3 is folded completely against the upper wall of the housing, so that the tip of the foot 4 touches this wall and the foot itself holds a synchronizing cable 8, projecting from the sidewall opposite the one shown, together with its synchronizing plug 9. This fourth position is the transport position, in which the device is switched off. Dashed lines denote that pivotal position of the bracket illustrated in FIGURE 1.

The bracket 3, as mentioned above, is rotatably mounted in the two circular openings 6 of FIGURES 1 and 2. In the embodiment shown, the openings lie partly at the upper edge of the lower half-shell 10 and partly at the lower edge of the upper half-shell 11 of the housing 5, which is composed of these two half-shells. In this manner, these structural components which were inserted in the lower half-shell before the upper half-shell was attached can be rigidly coupled to the two ends of the bracket.

As shown in FIGURE 3, a disc 15 is provided with an elongated perforation 17. This perforation receives the inner leg 16 of the bracket end leg 16', which is bent inwardly in a U-shaped manner in the plane of the bracket 3. This connection is made in such a manner that, when the bracket is pivoted, the disc rotates about its axis along with the bracket. The inside width between the legs 16 and 16' of the U-shaped bracket end correspond to the thickness of the right sidewall of the upper and lower half-shells 11, 10, so that the bracket is fixedly attached to the housing after the two half-shells are united and can only be pivoted about the opening 6.

Figure 4:
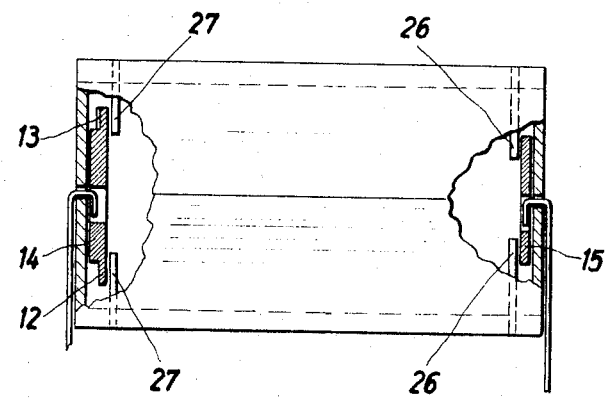
FIGURE 4 is a front elevation, in partial section, showing the intermediate walls; the ball stops, balls and contacts have been omitted for purposes of clarity.

The disc 15 is guided by means of an intermediate wall 26 (not shown in FIGURE 3), one half of which is provided in the lower half-shell 10, and the other half of which is provided in the upper half-shell 11. These serve to hold the disc 15 in a position parallel to the sidewalls of the half-shells. The disc is guided by this intermediate wall such that, after insertion into the space between the intermediate wall and the sidewall, it can not be displaced in any direction, but can only rotate about its axis when the bracket 3 is pivoted, carrying it along by means of the inner leg 16. Intermediate walls 26 and 27, for retaining discs 15 and 14, respectively, are illustrated in FIGURE 4.

In a manner corresponding to that described with respect to the right disc 15, a disc 14 is non-rotatably coupled with the left end of the bracket 3. A circular plate 12 larger than disc 14 and made of insulating material, is concentrically provided at the inner surface of the disc. It may, for example, be injection-molded of plastic together with the disc 14 or it may be a separate element, either spaced slightly from or adjacent to the plate 12. On the outer surface of plate 12, which thus is mounted parallel to the sidewall of the housing and slightly spaced therefrom, a metal strip 13, formed as a partial ring is mounted in a suitable manner. On this metal strip 13, two contacts 22 mounted in a stationary manner close to each other, are slidably movable. This, the plate 12 is a movable contact carrier for the operating switch, shown here in the form of a rotary switch.

When the bracket 3 pivots, plate 12, which is non-rotatably coupled with the left end of the bracket, rotates together with the metal strip 13. Thus the two contacts 22 are closed or electrically connected, in the two operating positions of the bracket. This is the case for the position of bracket 3 illustrated in FIGURE 3 in bold lines, and it is also the case for the position of the bracket when it is pivoted in a counterclockwise direction at right angles to the first-mentioned position. In the position displaced again by a right angle, which is the rest position, and the still further pivoted position, the transport position, the contacts are opened, thus turning off the device. The three last-mentioned positions of the bracket are shown in dashed lines in FIGURE 3.

In order to assure that the bracket 3, which has been pivoted into one of the four mentioned positions, does not slip out of position, four grooves or notches 18 are provided at the edges of the discs 14, 15, in which two balls 19, 23, mounted in ball stops, are effective, to hold the bracket in position. Each ball is under the pressure of a coil spring 20 provided in a cylindrical chamber element 21. It is also possible to provide a ball stop only on one of the two discs 15 or 14.

If desired, the disc 15 may actually be omitted altogether.

The pivotally mounted bracket 3 and the foot 4 may be bent from one piece of wire, as can be seen clearly from FIGURE 3. The knees 24, 25 at the rear end of the foot make it possible to push the foot into the camera mounting shoe from the rear of camera 1, in case the mounting shoe 2 is not accessible from the front of the camera. That is, the knees 24, 25, are offset from the plane of the foot 4.

It will be understood that the above description of the present invention is susceptible to various modifications, changes, and adaptations, and the same are intended to be comprehended within the meaning and range of equivalents of the appended claims.

What is claimed is:

1. In a unitary electronic flash device, the improvement comprising, in combination:
   a housing for the flash device;
   a bracket extending around the housing and pivotally connected to opposite sides thereof, at least a first end of the bracket extending through the housing into its interior;
   a foot attached to the central portion of the bracket for insertion in the mounting shoe of a photographic camera;
   a movable contact carrier mounted on the first bracket end to rotate with the bracket; and
   a pair of contacts mounted on the housing and arranged to contact the movable contact carrier to form a switch, so that when the foot and bracket are pivoted about the housing, in at least one position the switch is closed or actuated, and in at least one other position, in which said foot is spaced from said housing, the switch is open or de-actuated.

2. A unitary electronic flash device as defined in claim 1, wherein the movable contact carrier is a plate which is mounted parallel to the side of the housing through which the end extends and slightly spaced therefrom; and including a metallic strip in the shape of a partial ring provided on one surface of the plate as a movable contact, said pair of contacts being spaced from one another and capable of contacting the plate and the partial ring mounted thereon.

3. A unitary electronic flash device as defined in claim 1, further including means for maintaining the bracket in any of a plurality of predetermined positions, corresponding to operating, rest, and transport positions.

4. A unitary electronic flash device as defined in claim 3, wherein the means for maintaining the bracket includes a disc connected to the movable contact carrier and having notches in it, and a spring loaded ball acting upon said disc for maintaining it in those positions wherein the ball cooperates with a notch, the positions being defined as operating, rest, and transport positions.

5. A unitary electronic flash device as defined in claim 4, including a further disc at the other side of the housing from the first disc, connected to rotate with said bracket, and having notches in it, and spring loaded means co-operating with said notches for holding the disc and the bracket in the operating, rest, and transport positions.

6. A unitary electronic flash device as defined in claim 1, wherein the pivotally mounted bracket and the foot mounted in the central portion thereof are both formed from a single piece of wire.

7. A unitary electronic flash device in a housing, comprising, in combination: a bracket extending around the housing and pivotally mounted in opposite sides thereof;

a foot mounted on the central portion of the bracket for insertion into a shoe on a photographic camera; means for maintaining the bracket in any of a plurality of preselected positions; a plate mounted internally of said housing, connected to rotate with one end of the bracket, which end projects through the housing, the plane of the plate being perpendicular to the plane of the bracket; a metallic partial ring mounted on said plate; and a pair of contacts mounted on the housing for contacting the ring when the bracket is in certain of the preselected positions, and for contacting that portion of the plate not covered by the ring when the bracket is in others of said preselected positions, so that in said first-mentioned positions the contacts are electrically connected, and in said second-mentioned positions the contacts are electrically disconnected, said foot being spaced from the housing when said bracket is in at least one of said second-mentioned positions.

8. Apparatus as defined in claim 7, wherein the means for maintaining the bracket in certain preselected positions includes at least one disc, mounted parallel to said plate, and having indentations thereon; and means cooperating with said disc to hold it in the rotational positions where said indentations occur.

9. Apparatus as defined in claim 8, wherein the means cooperating with said disc includes a spring-loaded ball.

10. A device as defined in claim 8, wherein said foot is formed as a unit with said bracket.

11. Apparatus as defined in claim 10, wherein said foot has a shoulder portion at the end thereof adjacent the bracket, so that it may be mounted in the mounting shoe of the camera from the rear of the camera, by inserting the shoulder portion first.

12. In a unitary electronic flash device, mounted in a housing, including a foot for insertion in the mounting shoe of a photographic camera, the improvement comprising, in combination: a bracket extending around the housing and pivotally connected to opposite sides thereof, said foot being carried by the central portion of the bracket; a rotary switch mounted within the housing adjacent one of the ends of the bracket, which end projects into the housing; a movable contact carrier mounted on said bracket end and fashioned as the operating portion of the rotary switch, so that when the foot and bracket are pivoted about the housing, in at least one position the switch is actuated, and in at least one other position, in which said foot is spaced from said housing, the switch is de-actuated.

13. A camera and an electronic flash unit, comprising, in combination:

a camera having a lens on one side which defines a picture-taking direction, and a mounting shoe for a flash unit;

a flash unit having a pivotable mounting bracket;

a foot on the mounting bracket releasably inserted in the camera mounting shoe;

means for maintaining the flash unit in one of a plurality of predetermined positions relative to the camera; and switch means associated with the maintaining means for rendering the flash unit operable in certain ones of the predetermined positions and rendering it inoperable in the remainder of said positions, said foot being spaced from said flash unit when said flash unit is in at least one of said positions in which it is rendered inoperable.

14. A device as defined in claim 13, wherein the predetermined positions include: a forward position, wherein the flash unit points in the picture-taking direction; a rest position, wherein the flash unit points in a direction opposite the picture-taking direction; and a vertical position, wherein the flash unit points away from the camera and transversely of the picture-taking direction; the switch means rendering the flash unit operable in the vertical and forward positions and inoperable in the rest position.

References Cited by the Examiner
UNITED STATES PATENTS 2,898,447   8/1959   Hanlon _____ 240—1.3
3,177,353   4/1965   Schmidt _____ 240—1.3

JOHN M. HORAN, *Primary Examiner.*